(12) United States Patent
Lee

(10) Patent No.: US 6,948,899 B2
(45) Date of Patent: Sep. 27, 2005

(54) PALLETLESS LOADING STRUCTURE FOR STORAGE SYSTEM

(76) Inventor: Wan Young Lee, 103-202 Gwanak Hyeondae Apt., 1000 Bongcheon 3-dong, Gwanak-gu, Seoul 151-755 (KR)

(*) Notice: Subject to any disclaimer, the term of this patent is extended or adjusted under 35 U.S.C. 154(b) by 0 days.

(21) Appl. No.: 10/382,724

(22) Filed: Mar. 5, 2003

(65) Prior Publication Data

US 2004/0042880 A1 Mar. 4, 2004

(30) Foreign Application Priority Data

Sep. 4, 2002 (KR) .................................. 10-2002-0053232

(51) Int. Cl.$^7$ ................................................. B65G 1/12
(52) U.S. Cl. ..................... 414/254; 414/282; 414/279; 198/347.2
(58) Field of Search ...................... 414/279, 254, 414/271, 281, 282; 198/347.2

(56) References Cited

U.S. PATENT DOCUMENTS

| | | | | |
|---|---|---|---|---|
| 2,647,647 A | * | 8/1953 | Mihai .......................... | 414/254 |
| 3,016,154 A | * | 1/1962 | Giorgio et al. ............. | 414/254 |
| 3,633,769 A | * | 1/1972 | Dubinsky et al. ........... | 414/282 |
| 5,505,573 A | | 4/1996 | Han ............................. | 414/254 |
| 6,702,541 B1 | * | 3/2004 | Lee .............................. | 414/253 |
| 2002/0146305 A1 | | 10/2002 | Haag .......................... | 414/228 |

FOREIGN PATENT DOCUMENTS

| | | | |
|---|---|---|---|
| EP | 0337514 A2 | 10/1989 | |
| JP | 5052058 | 3/1993 | |
| JP | 05170307 A | * 7/1993 | ............ B65G/1/04 |
| JP | 6280416 | 10/1994 | |
| KR | 1993-0006344 | 7/1993 | |

* cited by examiner

Primary Examiner—Kathy Matecki
Assistant Examiner—Mark A. Deuble
(74) Attorney, Agent, or Firm—Sheridan Ross P.C.

(57) ABSTRACT

The invention provides a palletless loading structure for a storage system which comprises a plurality of storage forks including a first support beam and a plurality of storage fork bars mounted in regular interval to cross the first support beam at a right angle; a stacker crane and a including a plurality of transporting fork bars horizontally arranged in a regular interval to be alternatively positioned between the storage fork bars and a third support beam supporting the lower middle portion of the transporting fork bar, wherein any one height of the storage fork bar transporting fork bar is set to be relatively higher than the other one, and the fork bar of a relatively lower height includes a projecting tap mounted on the lower portion thereof, the projecting tap being mounted on the supporting beam.

9 Claims, 15 Drawing Sheets

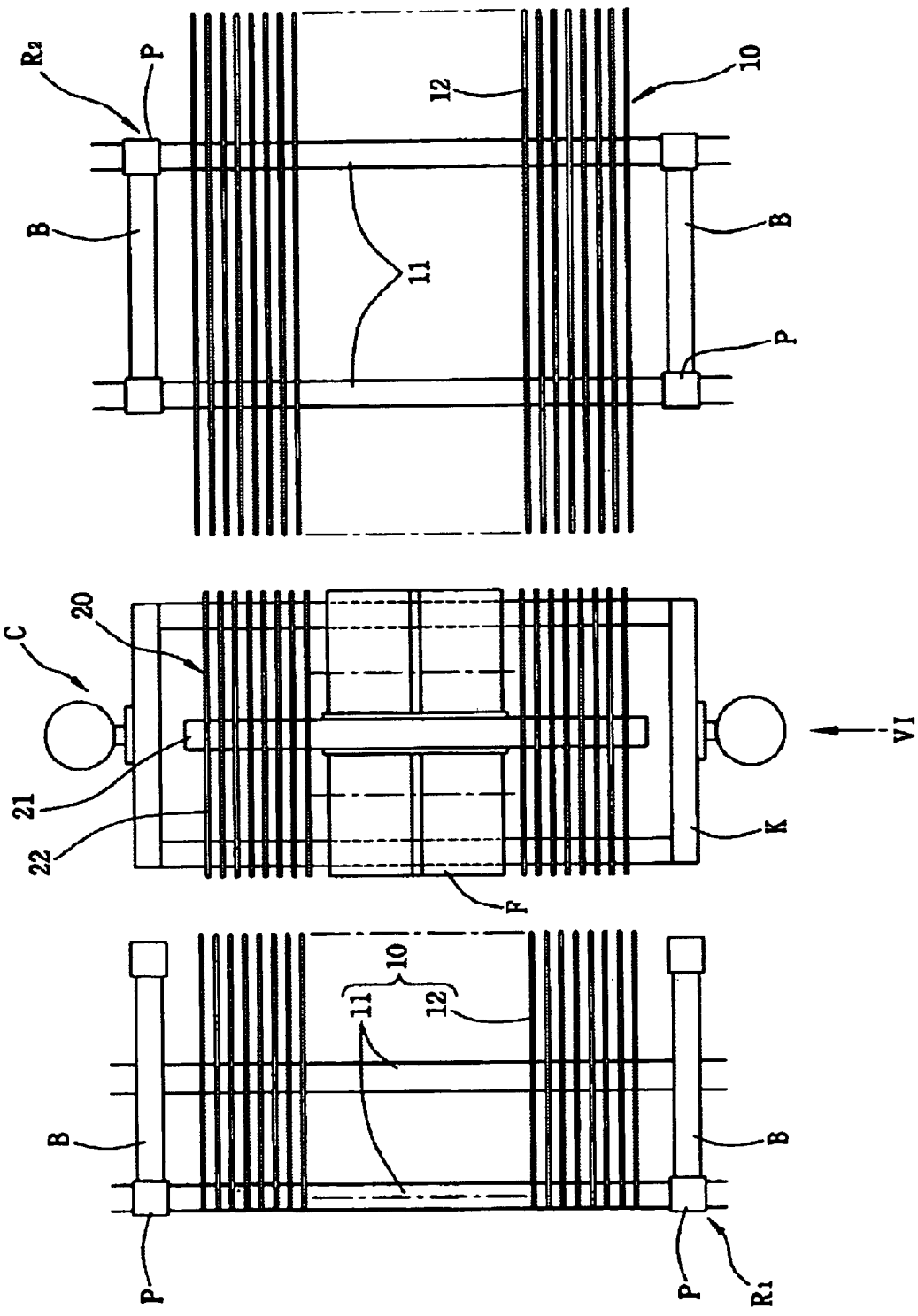

PALLETLESS LOADING STRUCTURE FOR STORAGE SYSTEM

BACKGROUND OF THE INVENTION

1. Field of the Invention

The present invention relates, in general, to a storage system such as automatic warehouses designed to take a great quantity of goods or many vehicles into or take them out of storage spaces on storage forks of racks in order to allow users to effectively store and manage goods or vehicles and, more particularly, to a palletless loading structure for a storage system for quickly and safely taking goods into and/or taking them out of a storage space on storage forks free of additional support pallets.

2. Description of the Prior Art

As well known to those skilled in the art, storage systems are a facility designed to store goods or other materials in a limited storage place and manage the stored goods or materials, effectively, which has been widely used as part of a large-scale material flow system or a warehouse in other industrial work places.

As shown in FIG. 1, a conventional storage system comprises a plurality of racks R having a vertical multistory configuration of a plurality of loading stages L, in which the racks R are arranged on a support surface spaced in an interval from each another to form a building structure and the loading stage L includes a movable support pallet (not shown) laid thereon to load goods, and a transporting unit T such as a lift or a stacker crane installed in an elevation space between the racks R to be vertically moved to put goods into or take goods out of a storage space on the loading stage L.

The transporting unit T carries a support pallet loaded with the goods W to an empty loading stage L of the rack R. Then, the goods-loaded support pallet is pulled over in a horizontal direction by a traction unit (not shown) to be placed onto the empty loading stage L and the goods shipment from the storage spaces vise versa.

In the storage system, what is more important is the quick and accurate storage, shipment and inventory management of goods W. To it, the transporting unit T is under the control of a computer (not shown) to be automatically operated, so that goods W are automatically put into or taken out of the storage space on their loading stages L with particular inherent number or code being allotted to goods W and the loading stage L, respectively.

However, the conventional storage system needs a plurality of support pallets and at least one traction unit, separately, for the storage and shipment, so its loading configuration becomes complex. Further, a gross load imposed on the racks R as well as on the traction unit T during carrying goods W along with the support pallet is increased by a weight of a plurality of support pallets or one pallet and has to be reflected into the total configuration design of the storage system or the traction unit T. In case of the traction unit T, the support pallet has a bad effect on a power and time used up in carrying goods W.

If some goods-free or empty support pallets are placed on the loading stages S, it is necessary for the transporting unit T to remove the empty support pallet from the corresponding loading stage S in advance. For example, the transporting unit T is moved to the loading stage S to pull out the empty support pallet therefrom for next goods storage and then to a carrying-in position to be on standby. Otherwise, the traction unit T carries the empty support pallet to be put on another loading stage L, on which nothing is laid, according to a storage or shipment control signal before being moved along with the empty pallet to a standby position. Thereafter, the transporting unit T performs the normal operation for the storage or shipment that target goods W is stored in a predetermined loading stage L or taken out of its loading stage L along with the corresponding support pallet. For it, the conventional storage system has a disadvantage in that it takes much time in putting goods into or taking goods out of the storage spaces of the loading stages following by the separate dealing of the support pallet.

In an effort to overcome the above-mentioned problems experienced in the conventional storage system using such support pallets, a palletless loading configuration without requiring support pallets in putting goods into or taking goods out of the storage spaces on loading stages has been proposed and used. A typical example of such palletless loading structures is disclosed in International Laid-open Publication No. WO 87/02405 entitled "Vertical Storage Apparatus and Control Method Thereof".

As shown in FIGS. 2A and 2B, the vertical storage apparatus comprises a single rack unit including an elevation space and multi-storied storage racks provided on at least one side out of the left side, right side, front side and rear side of the lift space. The rack comprises a plurality of storage forks 1 normally arranged on every story thereof to form two rows spaced apart in a regular interval from each another. The elevation space defined between the storage spaces comprises a pair of elevation forks 2 mounted to be moved up and down therein to carry goods W in a vertical direction. The storage fork 1 reciprocates between a storage space and the elevation space by a drive unit (not shown) in a manner to be moved toward or away from a position above or under the fork bars of the elevation forks 2 according to the guidance of a horizontal guide beam 3 of the rack. The elevation fork 2 comprises a pair of elevation forks 2a and 2b faced to each other, fork bars of which are vertically passed through between fork bars of the storage fork 1 to be placed at a loading/unloading position in the elevation space, without interfering with the fork bars of the storage fork 1. In such a case, the paired forks 2a and 2b are synchronously moved.

In a storage operation, the elevation fork 2 loaded with goods W on its fork bars are first moved upward in the elevation space to a desired position higher than that of a target empty storage fork 1. The target empty storage fork 1 is horizontally moved inward into the elevation space by the drive unit to a loading position under the fork bars of the elevation fork 2. The elevation fork 2 is moved downward to cross the fork bars of the storage fork 1 in order to load the goods W onto the storage fork 1. The storage fork 1 with the goods W is returned by the drive unit to its original position, so that goods W is taken into a storage space of the rack.

However, the vertical storage apparatus free of a pallet has a problem in that the moving distance of the elevation fork 2 is relatively longer, because the elevation fork 2 passes through or cross the storage fork 1, vertically, during a loading or unloading operation.

That is, a target storage fork 1 must be horizontally moved to a loading or unloading position under or above an elevation fork 2 without causing any interference between goods W and any one of the storage and elevation forks 1 and 2. Therefore, a substantial travel of the elevation fork 2 is a sum of adding operational allowance gaps "$g_1$" and "$g_2$" to two heights $h_1+h_2$ of the storage fork 1 and the elevation fork 2. It takes a relative longer time for the storage and shipment of goods W, so that the vertical storage apparatus fails to reduce the time consumption during a loading or unloading operation.

Another typical example of a loading structure for a storage system free of a pallet is referred to Japanese Patent Laid-open Publication No. Heisei. 5-52058 entitled "Loading structure for stacker crane-type parking garages".

As shown in FIGS. 3A and 3B, a loading structure for a stacker crane-type parking lot comprises two racks 4 installed on a support surface to be spaced apart at an interval from each other and a stacker crane (not shown) mounted between the racks 4 to enable a lift fork 7 to be moved up and down with being loaded with goods W. Multiple cantilever support bars 6 are provided on the right and left shelf members of each rack 4 to form a storage space inside horizontal support beams 5. The lift fork 7 includes a plurality of arm bars 9 provided on both sides of a body 8 of the stacker crane to cross the support bars 6 without any interference during being lifted or lowered in a protruded state.

In a loading operation, the lift fork 7 loaded with goods W is first moved upward in an elevation space to a desired position higher than that of the support bar 6 and then horizontally to be entered into a target empty storage space of the racks 4. Thereafter, the lift fork 7 is moved downward to cross the support bar 6 of the rack 4. During the downward movement of the lift fork 7, the arm bars 9 pass through the spaces between the support bars 6 without any interference to load goods W onto the support bars 6. The lift fork 7 is, thereafter, laterally moved from the position under the support bars 6 to a position inside the elevation space, prior to being moved to a standby position where another goods W are loaded on the lift fork 7.

However, the loading structure is designed such that the lift fork 7 passes through the support bars 6 from above its upper portion to below its lower portion thereby to return to its original position, so it has a limitation to the time reduction in taking in or out of goods W due to a relatively longer traveling distance.

Therefore, a substantial travel of the lift fork 7 is a sum of adding allowance gaps "$g_1$" and "$g_2$" for entering into/retracting from the rack 4 to two heights $h_3+h_4$ of the support fork 6 and the lift fork 7. It has a limitation to the shortening of a vertical traveling distance of the lift fork 7.

In addition, the support bars 6 are extended from both sides of the horizontal support beam 5 to a predetermined length to allow goods W to be placed thereon, because goods W has to have widths larger than that of a space defined between the support bars 6 in each storage space to be effectively stored on the support bars 6 without being dropped through the space. It has a limitation to a size of goods W that can be stored in the storage system.

SUMMARY OF THE INVENTION

Accordingly, the present invention has been made keeping in mind the above problems occurring in the prior art. According to the fact of that goods having a nearly flat bottom side which is able to be supported at a same plane can be easily dealt without a pallet, an object of the present invention is to provide a palletless loading structure for a storage system for quickly and safely taking goods into or taking them out of storage spaces on storage forks of racks without requiring a support pallet.

Another object of the present invention is to provide a palletless loading structure for a storage system to easily store goods of various sizes in a predetermined storage space without any limitation to the size of goods to be loaded.

In order to accomplish those and these objects, the present invention is considered of a palletless loading structure for a storage system to enable a transporting fork having fork bars to move upward and downward passing through a storage fork of a rack having another fork bars by a minimum allowance range which be requested to take goods into or out of the storage fork. The consideration could be found out that it is possible to permit the transporting to approach the storage fork in a lateral direction and overlap their two kinds of fork bars relative to each another, alternatively, within the minimum allowance moving distance.

FIGS. 4A, 4B, 4C and 4D are schematic views showing an operational theory of a palletless loading structure for a storage system according to the present invention.

As shown in FIG. 4A, a plurality of storage fork bars 12 are mounted to the upper surface of a first support beam 11 in a regular interval to be constituted as a storage fork 10, and a plurality of transporting fork bars 22 are mounted to the upper surface of a second support beam 21 in a regular interval to be constituted as a transporting fork 20. In the two types of forks 10 and 20, a height "a" of the storage fork bar 12 is determined to be equal to or larger than a height "b" of the transporting fork bar 22. But, in this case, it is necessary to secure an allowance gap "$g_1$" between the transporting fork 20 and the storage fork 10, because the transporting fork 20 must be positioned at a level higher than the upper surfaces of the storage fork bars 12 in order to enable goods W to be taken into or taken out of a storage space during the lateral moving of the transporting fork 20 into the storage fork 10. And, the structure causes the fore head of the storage bar 12 to be hung up on the support beam 21, so it doesn't allow the transporting fork 20 to be laterally moved into the storage fork 10 to its last position.

As shown in FIG. 4B, another palletless loading structure has a concept different from that of FIG. 4A. A height "a" of each storage fork bar 12 is determined to be less than the height "b" of each transporting fork bar 22 to secure allowance gaps "$g_1$" spaced away from the upper and lower surfaces of the storage fork 10. As the transporting fork 20 is overlapped into the storage fork 10, the transporting fork bar 22 is extended upward and downward by the allowance gaps "$g_1$" from the upper and lower surfaces of the storage fork bar 12. The structure also causes the fore head of the transporting fork bar 22 to be hung up on the support beam 21, so it doesn't allow the transporting fork 20 to be laterally moved into the storage fork 10 to its last position.

As shown in FIG. 4C, another palletless loading structure is shown. A height "b" of each transporting fork bar 22 is determined to be larger than the height "a" of each storage fork bar 12 to secure allowance gaps "$g_1$" spaced away from the upper surface of the storage fork 10, so the upper surface of the transporting fork bar 22 is extended to be positioned at a level higher than the upper surface of the storage fork bar 12 by the allowance gap "$g_1$". In this case, the transporting fork 20 may approach into the storage fork 10, but it doesn't permit the transporting fork 20 to be moved downward relative to the storage fork 10, thereby blocking the transporting fork 20 from loading goods W onto the storage fork 10.

As shown in FIG. 4D, still another palletless loading structure is shown, a height "b" of each transporting fork bar 22 is determined to be less than the height "a" of each storage fork bar 12. The transporting fork 20 includes a lower projecting tap 23 having a predetermined height "s" which is provided on the supporting beam 21 below a lower portion of each transporting fork bar 22. Therefore, there is formed a gap "s" corresponding to the height of the projecting taps 23 between the upper surface of the support beam 21 and the lower surface of the transporting fork bar 22.

Herein, it is noted that if the transporting fork 20 is approached into the storage fork 10, a height difference "a−b" between the storage bar 12 and transporting fork bar 22 is determined to be larger than a lower allowance gap "$g_2$" provided between the upper surface of the storage fork bar 12 and the transporting fork bar 22. The gap "s" is determined to be larger than a sum of the upper and lower allowance gaps "$g_1$" and "$g_2$", which is required for forcing the transporting fork 20 to load goods W onto the storage fork 10. It is represented as expressions as follows: a−b>$g_2$, and s>$g_1$+$g_2$.

In this case, a substantial height "s+b" of the transporting fork 20 is higher than the height "a" of the storage fork 10 to secure at least upper allowance gap "$g_1$", that is, s+b>a+$g_1$. Therefore, even though the transporting fork 20 laterally approaches into the storage fork 10, the portion of the transporting fork bar 22 is positioned at a level higher than the upper portion of the storage fork bar 12 that forms the upper allowance gap "$g_1$". The support beam 21 of the transporting fork 20 is not under any interference with the forehead of the storage fork bar 12 due to the height "s" of the tap 23.

In addition, a height "a" of each storage fork bar 12 is larger than a height "b" of each transporting fork bar 22 to secure at least the lower allowance gap "$g_2$". That is, a>b+$g_2$. Therefore, when the transporting fork 20 comes down in a vertical direction relative to the storage fork 10 after completely approaching the storage fork 10, the upper surface of the transporting fork bar 22 is placed at a level lower than the upper surfaces of the storage fork bars 12 that forms the lower allowance gap "$g_2$". The lower portion of the transporting fork bar 20 doesn't cause any interference with the support beam 11 of the storage fork 10.

In an aspect, the present invention provides a palletless loading structure for storage systems, comprising: a storage fork including a first support beam horizontally mounted near the middle of the storage space in the edge racks $R_1$, a second support beam mounted near the middle of the storage space and in a regular interval from each other to make the storage space be right and left symmetric in the intermediate racks $R_2$ mounted between the edge racks $R_1$ and a plurality of storage fork bars mounted on an upper portion of the first support beam in a regular interval while crossing the first support beam at a right angle; and a stacker crane operable in multi-axial directions, as the transporting means, and including a plurality of transporting fork bars horizontally arranged in a regular interval to be alternatively positioned between the storage fork bars and a third support beam supporting the lower middle portion of the transporting fork bars, wherein any one height of the storage fork bar and the transporting fork bar is set to be relatively higher than the other one, and the fork bars having a relatively lower height include a projecting tap mounted on the lower portion thereof, the projecting tap mounted on the support beam, in which the transporting fork approach laterally from one side of the storage space in the edge racks $R_1$ and from both right side and left side in the intermediate racks $R_2$ mounted between the edge racks $R_1$, lift above, drop below and withdrawn from the storage fork with being alternatively superposed between them.

It is more preferable that a height of the projecting tap is determined to be larger than a height of lifting and descending the transporting fork to load goods W onto the storage fork. In addition, a stacker crane is preferably used as the transporting unit of the palletless loading structure.

In another aspect, the present invention provides a palletless loading structure for a storage system, comprising: a storage fork including a first support beam horizontally near the middle of the storage space in the edge racks $R_1$, a second support beam mounted near the middle of the storage space and in a regular interval from each other to make the storage space be right and left symmetric in the intermediate racks $R_2$, mounted between the edge racks $R_1$ and a plurality of storage fork bars each having a first lower projecting tap with a predetermined height being extended downward from a lower portion thereof, which is horizontally mounted in a regular interval to an upper surface of the support beam while crossing the support beam at a right angle; a stacker crane operable in multi-axial directions, as the transporting means and including a plurality of transporting fork bars horizontally arranged in a regular interval to be alternatively positioned between the storage fork bars and a third support beam supporting the lower middle portion surface of the transporting fork bars; wherein the transporting fork bars include a second lower projecting taps having a predetermined height extended downward from the center portion thereof, in which, the transporting fork approaches laterally from one side of the storage space in the edge racks $R_1$, and from both right side and left side of the storage space in the intermediate racks $R_2$ mounted between the edge racks $R_1$, lift above, drop below and withdrawn from the storage fork with being alternatively superposed between them.

Accordingly, when a transporting fork is advanced into or retreated out of a storage fork, the present invention enables any one of fork bars to be lifted up to at least minimum allowance gap relative to the other. It is possible for good W to be quickly and safely taken into or taken out of a storage space without causing any interference between the fork and its relative fork bar and also excludes the use of a separate pallet.

Also, the fork bars are mounted to the upper surface of the support beam to be not separated from the storage fork and form a single row of fork bars. It is possible to easily, simply and safely store a variety of goods on the storage fork independent of its size, even if the sizes of the goods do not exceed a predetermined size of each storage space of the racks. Therefore, the palletless loading structure accomplishes the quick and precise loading or unloading of goods into or from storage spaces of racks, thereby enhancing its operational reliability, achieving the effective management and structural stability of the storage system.

BRIEF DESCRIPTION OF THE DRAWINGS

The above and other objects, features and other advantages of the present invention will be more clearly understood from the following detailed description taken in conjunction with the accompanying drawings, in which:

FIGS. 2A and 2B are schematic views illustrating a palletless loading structure of another conventional storage system, in which FIG. 2A is a plan view showing the palletless loading structure and FIG. 2B is a side view showing the operation of the palletless loading structure;

3A is a plan view showing a configuration of the palletless loading structure and FIG. 3B is a side view showing the loading operation of the palletless loading structure;

FIG. 5 is a plan view illustrating a palletless loading structure for a storage system according to a first embodiment of the present invention;

DESCRIPTION OF THE PREFERRED EMBODIMENTS

Figure 1:
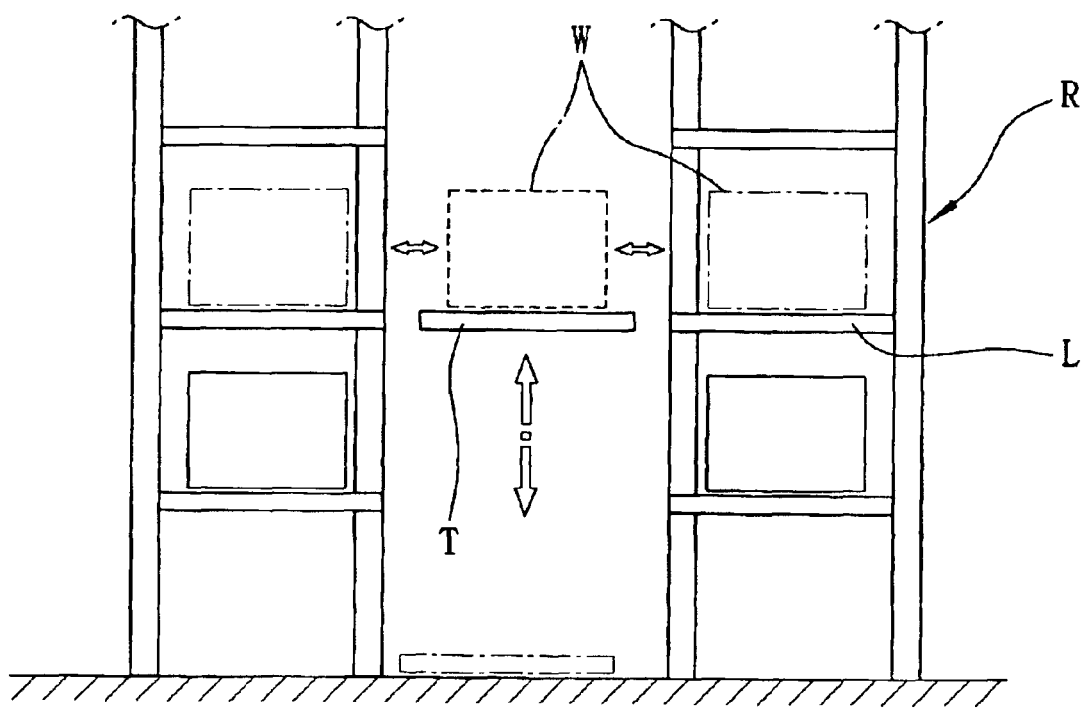
FIG. 1 is a schematic front view illustrating a configuration of a conventional storage system.
Figure 2A:
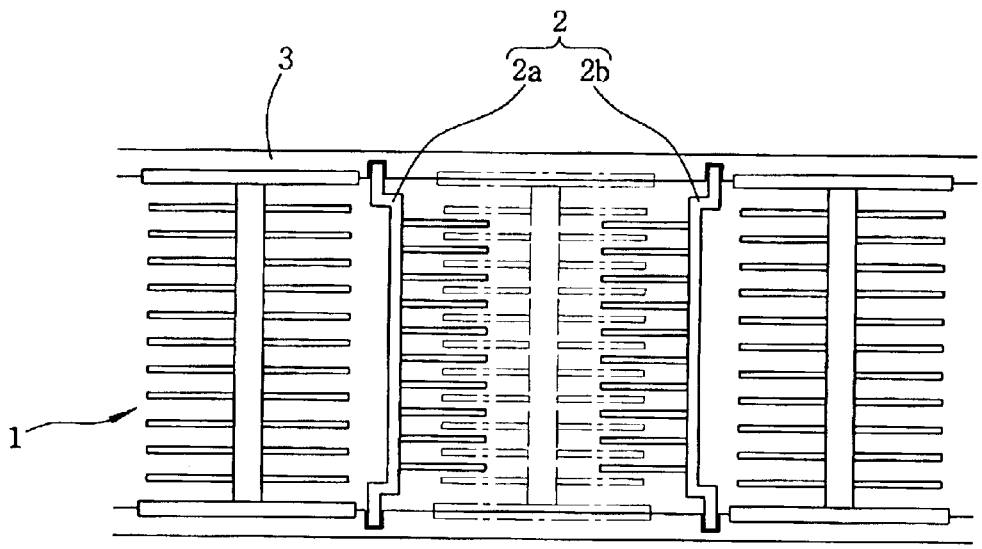
Figure 2B:
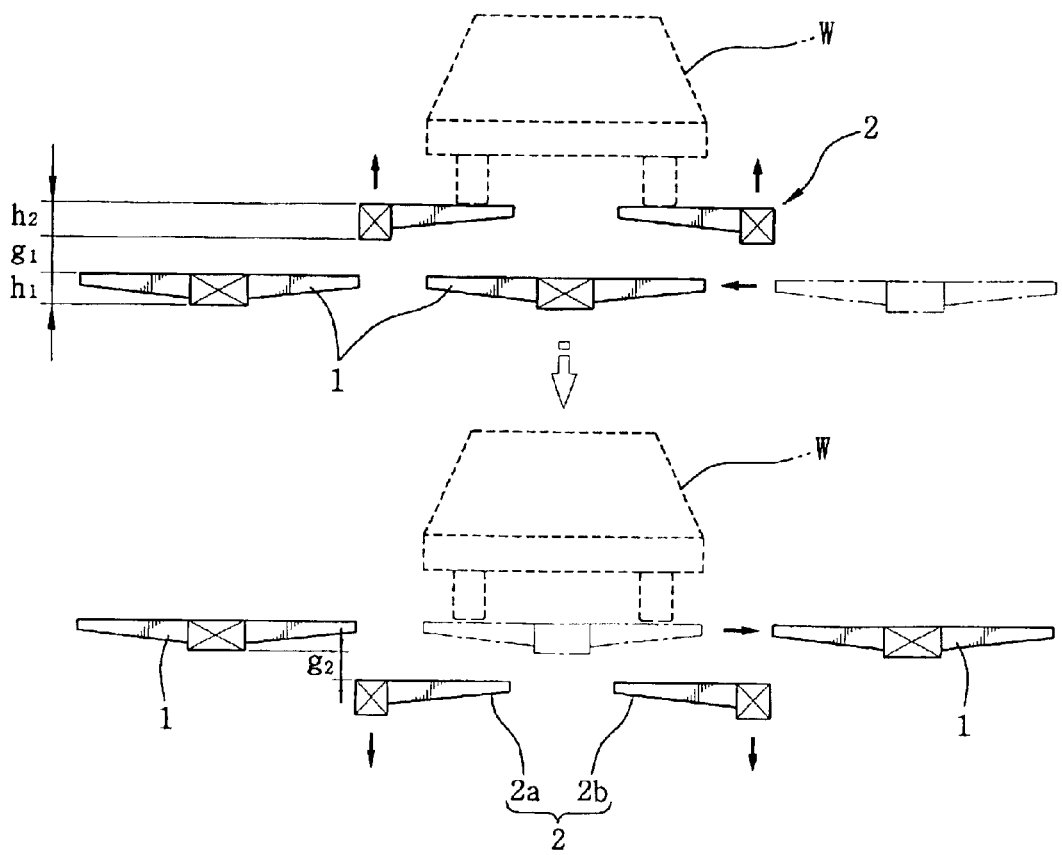
Figure 3A:
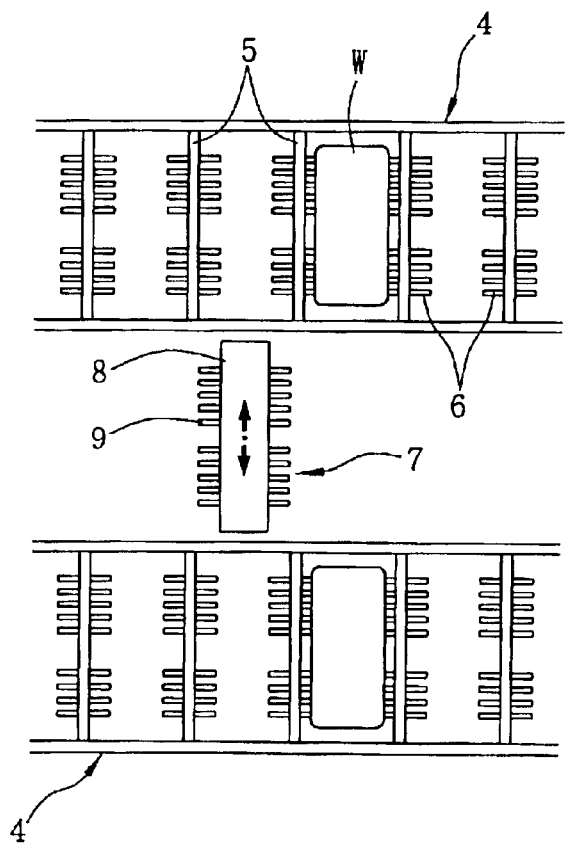
FIGS. 3A and 3B are views illustrating a palletless loading structure of another storage system, in which FIG.
Figure 3B:
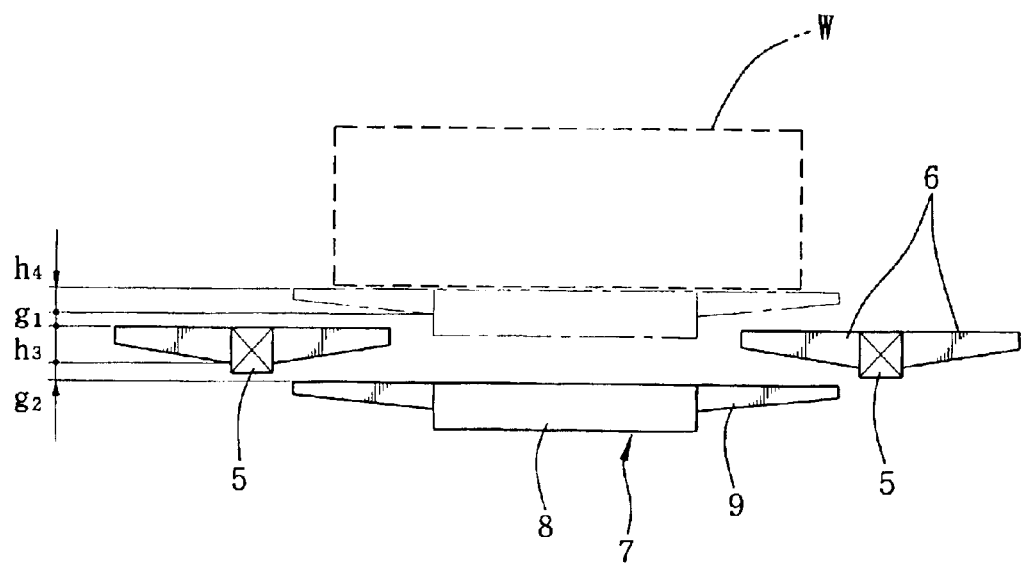
Figure 4A:
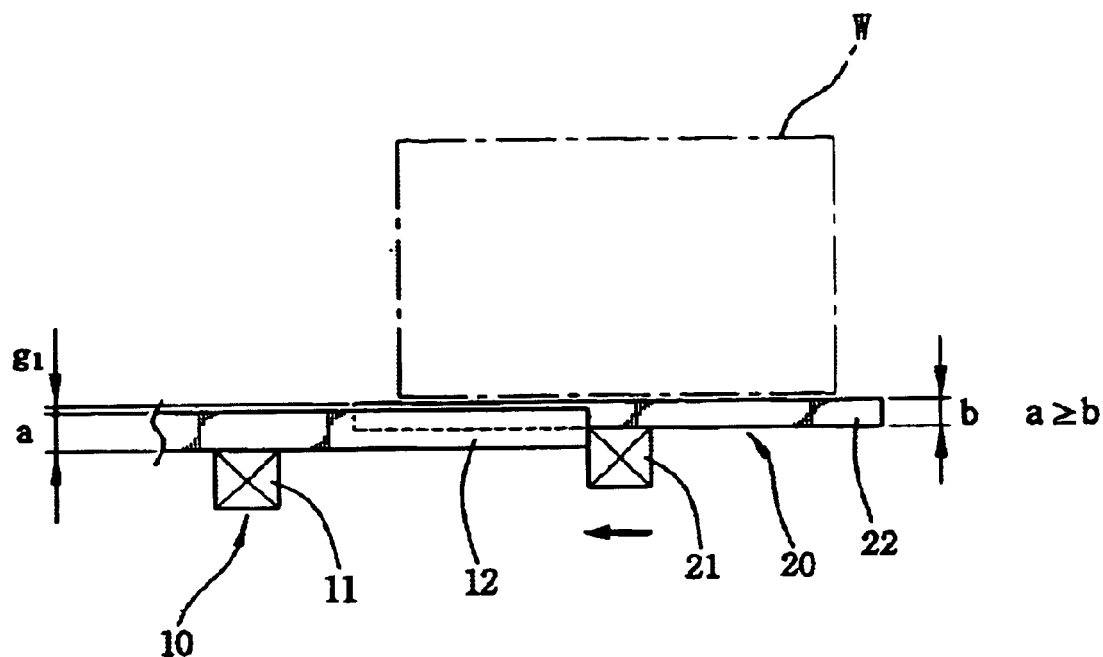
FIGS. 4A, 4B and 4C are schematic views illustrating conventional palletless loading structures of various storage systems according to prior art.
Figure 4B:
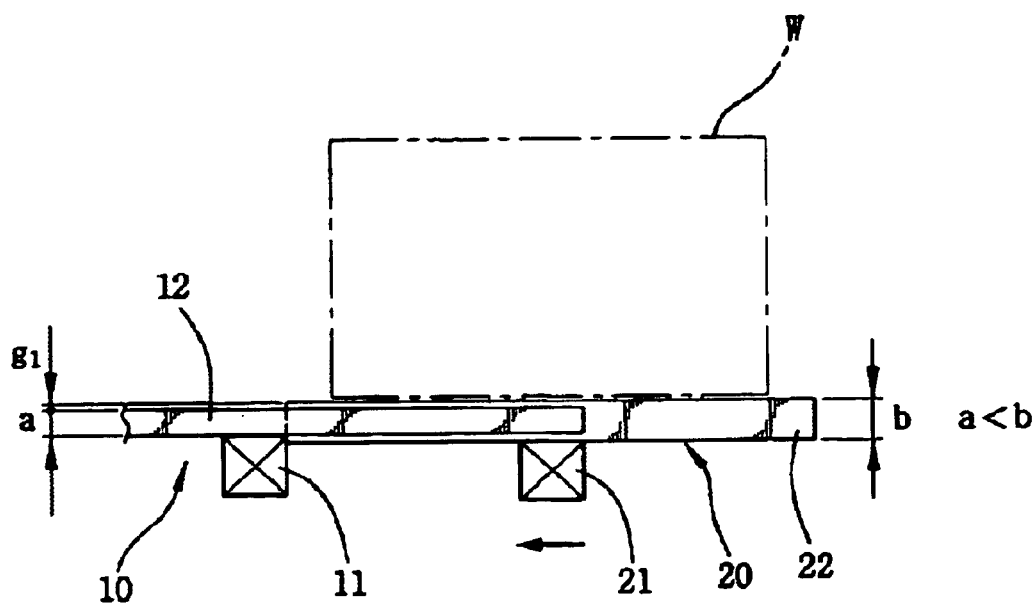
Figure 4C:
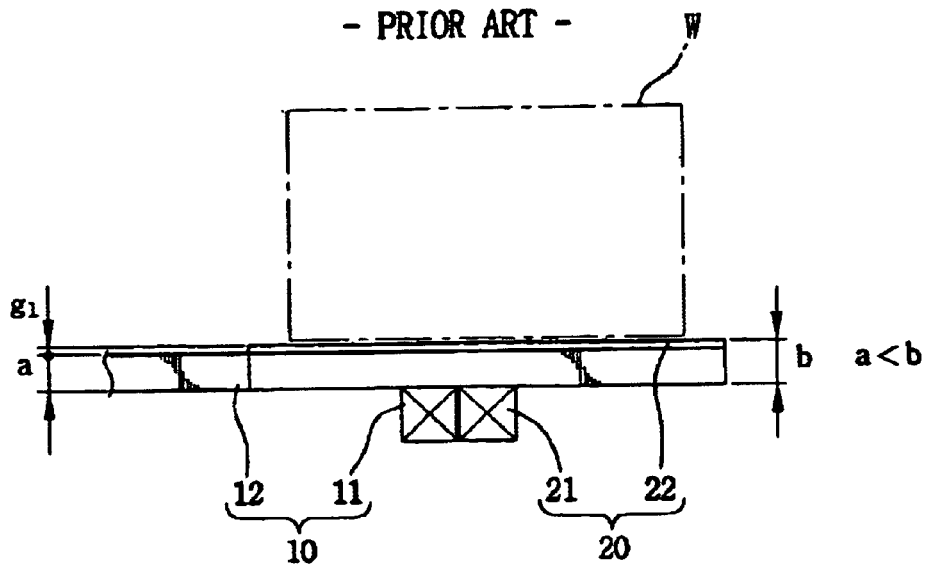
Figure 4D:
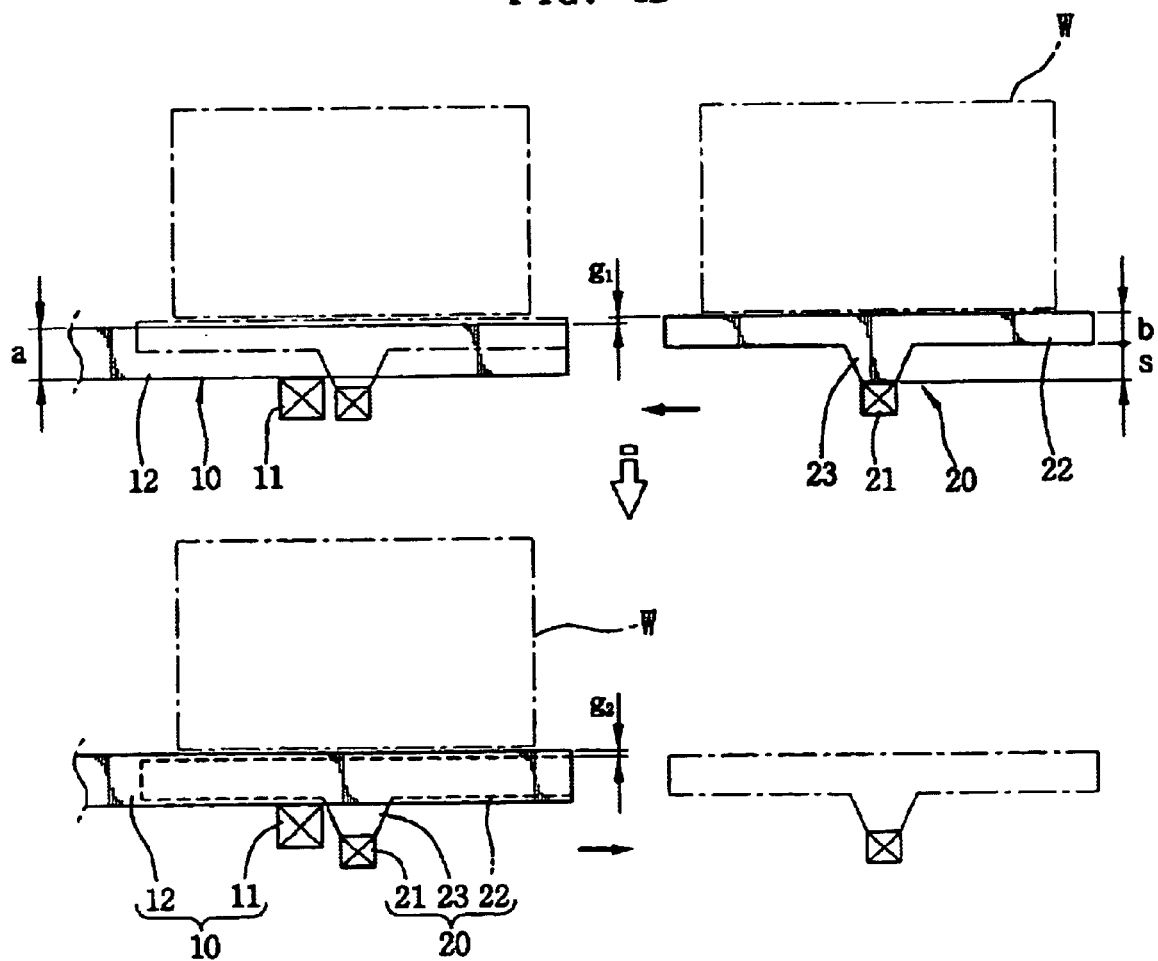
FIG. 4D is a schematic view illustrating palletless loading structure of the storage system associated with operation principals of the present invention.
Figure 6:
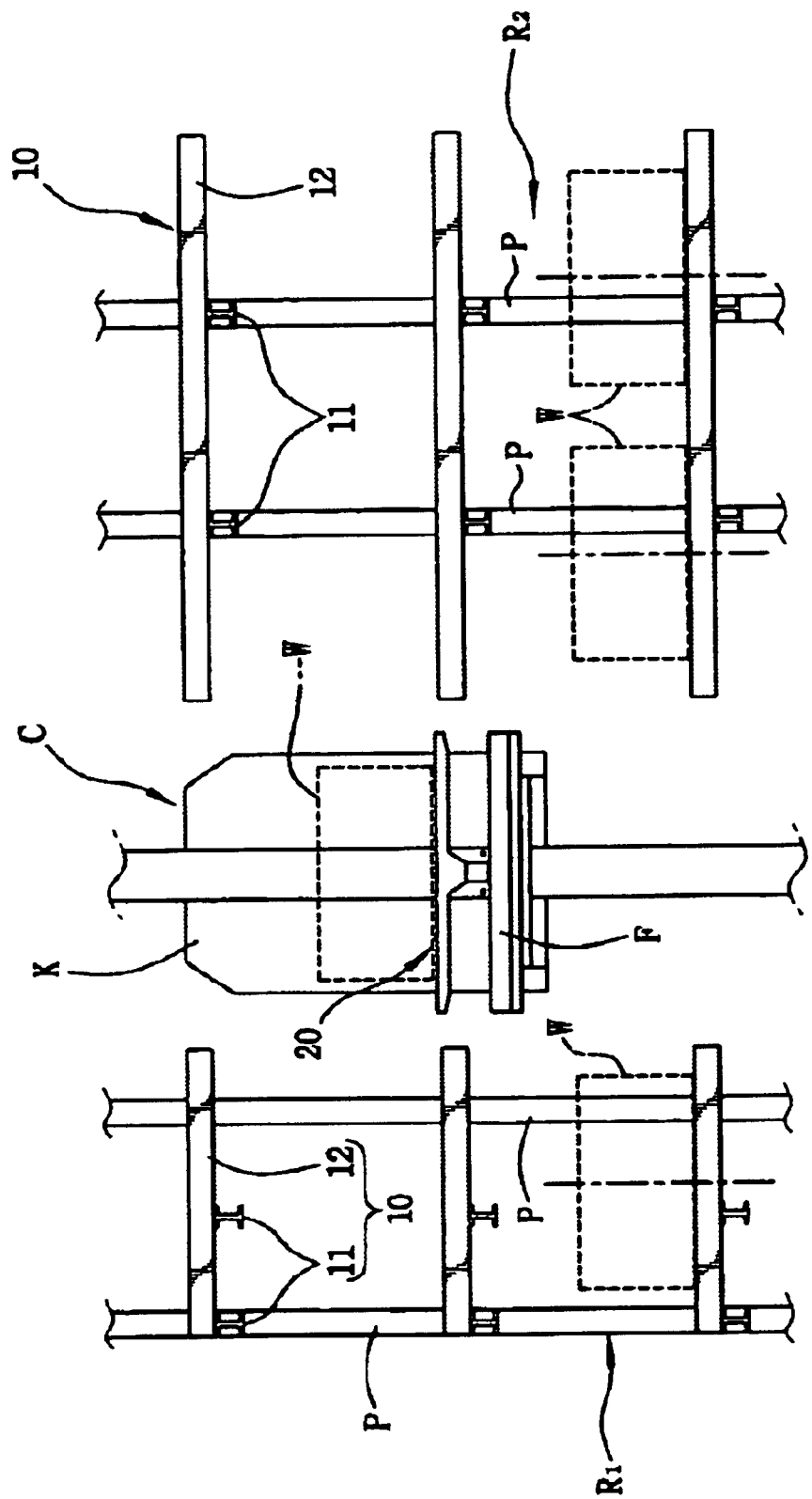
FIG. 6 is a front view illustrating the palletless loading structure for the storage system viewed along arrow VI of FIG. 5.

Reference should now be made to the drawings, in which the same reference numerals are used throughout the different drawings to designate the same or similar components.

FIGS. 5, 6 and 7A to 7D show a palletless loading structure for a storage system and its operation according to a first embodiment of the present invention. As shown in the drawings, the palletless loading structure comprises a plurality of storage forks 10 fixedly provided in storage spaces of racks R to support firm goods W having a nearly flat bottom side thereon and a transporting for 20 for being laterally approached to or withdrawn from a storage fork 10 by means of a transporting unit operable in multi-axial directions in order to load goods W onto or unload goods W from the storage fork 10.

For ease of description, a beam which connects posts P to each another widthwise in racks R in the drawings will be referred to as a horizontal beam B, and a beam which connects posts P to each another lengthwise in racks R in the drawings will be referred to as a connecting beam.

The storage fork 10 comprises a first support beam 11 and a plurality of storage fork bars 12 mounted on the upper surface of the support beam 11 to cross the support beam 11, which are spaced away in a regular interval from each another. The storage fork bars 12 are a longer plate type having a predetermined width and length, which are mounted along the length direction of the supporting beam 11 on the upper surface thereof in parallel to each another.

The support beam 11 of each storage fork 10 extends between two neighboring horizontal beams B of the racks R. In terms of the weight balance of goods W to be stored on a storage fork 10, it is preferable to arrange the support beam on the middle portion of the storage fork bar 12, but in order to establish a complete lateral approach of the transporting fork 20 to the storage fork 10, each center of the support 11 is positioned as its width far away from the center of each storage space in an approaching direction of the transporting fork 20 to each support beam. In this case, the eccentricity of the support beam 11 is determined to be at least larger than the width of a support beam 21 of the transporting fork 20.

Therefore, it is desirable to mount an additional support beam 11 to the ends of the storage fork bars 12 opposite to the transporting fork approaching side in order to promote the structural stability of the storage fork 10.

A rack R includes a plurality of posts P, horizontal beams B, and connecting beams fabricated to form a lattice structure having multistory storage spaces. The two support beams 11 of each storage fork 10 collaterally function as the connecting beams of the rack R. This also means that the connecting beams of each rack R function as the support beams 11 of the storage forks 10.

In case that the storage forks 10 are mounted on an edge rack "$R_1$" on both outmost sides of the storage system, it allows the transporting fork 20 to be accessed only from any one of the left and right sides of the storage fork 10. The support beams 11 are mounted on the middle portions of the horizontal beams B of the rack "$R_1$" from the side that the transporting fork 20 approaches to. The storage fork bars 12 are projected from the support beam 11 to be leaned toward the transporting fork side up to at least ½ of the full length of each storage fork bar 12, thus creating a cantilever beam structure.

The storage system also includes intermediate racks "$R_2$" mounted between the edge racks "$R_1$" to permit the transporting fork 20 to be approached to both sides of the storage forks 10. That is, two support beams 11 are extended lengthwise between posts P of the rack "$R_2$". The storage fork bars 12 have a length twice as long as the storage fork bar 12 of the end rack "$R_1$", both ends of which are projected from both sides of the two support beams 11 in opposite directions to each other, thus creating an equal-arm beam structure.

The transporting fork 20 comprises a support beam 21 and a plurality of transporting fork bars 22 mounted on the supporting beam 21 to be alternatively in parallel to the storage fork bars 12, in which the support beam 21 is positioned at the lower middle portions of the transporting fork bars 22 to cross the transporting fork bars 22 in a regular interval from each another.

The transporting fork bars 22 are a long strip having a predetermined thickness and width, which are disposed widthwise in a larger interval than its width to be superposed between the storage fork bars 12.

In the present invention, it is possible to use a variety of multi-axial transporting units as the transporting unit for driving the transporting fork 20. Preferably, a tri-axial stacker crane C operable in three axial directions may be used as a transporting unit for the transporting fork 20. In this case, the transporting fork 20 may be mounted on a lateral movement fork F of the stacker crane C or may be directly attached to the stacker crane C without the fork F.

As shown in the drawings, the storage fork bar 12 of each storage fork 10 has a height "a" which is larger than a height "b" of the transporting fork bars 22. Each of the transporting fork bars 22 has a lower projecting tap 23 at the middle portion of its lower surface. The transporting fork bars 22 are mounted to the upper surface of the support beam 21 to secure a predetermined height "$s_1$" of the projecting taps 23. The height "$s_1$" is determined so that the total height of the transporting fork bar 22 and the projecting tap 23 is larger than that of each storage fork bar 12.

The difference of the height between two types of fork bars 12 and 22 is determined to be larger than an operational allowance gap "$g_1$" or "$g_2$" which is provided between the storage and transporting fork bars 12 and 22. It allows the transporting fork 20 to be horizontally moved into the storage fork 10 without causing any interference between goods W and the upper end of the storage fork 10 or the transporting fork 20, when the transporting fork 20 approaches to or withdraws from the storage fork 10.

That is, when the transporting fork 20 loaded with goods W laterally approaches the storage fork 10 with the upper surfaces of the transporting fork bars 22 being leveled with the upper surfaces of the storage fork bars 12 without any allowance gap between them, the goods W comes into contact with the upper surfaces of the storage fork bars 12, so the transporting fork 20 fails to approach into the storage fork for storing the goods W thereon due to the interference between them. Therefore, in order to avoid the interference between the goods W and the storage fork bars 12, it is necessary to force the transporting fork 20 loaded with goods W to approach the storage fork at a level higher than the upper surfaces of the storage fork bars 12 by the upper allowance gap "$g_1$".

On the contrary, when the transporting fork 20 withdraws from the storage fork 10 after loading the goods W onto the storage fork bars 12, it is necessary to force the transporting fork bars 22 to be positioned at a level lower than the upper surfaces of the storage fork bars 12 by the lower allowance gap "$g_2$" in order to avoid the interference between goods W and the transporting fork bars 22. Of course, if goods W is taken out of the storage fork 10, the empty transporting fork 20 laterally approaches the storage fork 10 with the lower allowance gap "$g_2$" and laterally withdraws from the storage fork 10 with the upper allowance gap "$g_1$" after the loading of goods W thereon.

Also, it is necessary to force the transporting fork bars 22 to be free from the interference with the support beam 11 of the storage fork 10, even if the transporting fork 20 is positioned at a level lower than the upper surfaces of the storage fork bars 12 by the lower allowance gap "$g_2$". The height "a" of the storage fork bar 12 is larger than that "b" of the transporting fork bars 22 by at least operational allowance gap "$g_1$" or "$g_2$".

The upper and lower operational allowance gaps "$g_1$" and "$g_2$" are set at a minimum gap which allows the storage and transporting fork bars 12 or 22 to be free from the interference with goods W during being transported or loaded on a storage fork 10 by the transporting fork 20.

The height "$s_1$" of the lower projecting tap 23 formed at each of the transporting fork bars 22 is determined to be larger than a sum of the upper and lower operational allowance gaps "$g_1$" and "$g_2$", that is, $s_1 > g_1 + g_2$. The reason is why the support beam 21 of the transporting fork 20 does not interfere with the fork bars 12 of the storage fork 10, when the transporting fork 20 is horizontally entered into the storage fork 10 at a level higher than the upper surfaces of the storage fork bars 12 by the upper allowance gap "$g_1$". It means that the height "$s_1$" of the lower projecting tap 23 is larger than a height "$g_1$" and "$g_2$" necessary for lifting and dropping the transporting fork 20 to smoothly load or unload goods W onto or from the storage fork 10.

The operation of the palletless loading structure for the storage system will be described with reference to FIGS. 7A, 7B, 7C and 7D.

Figure 7A:
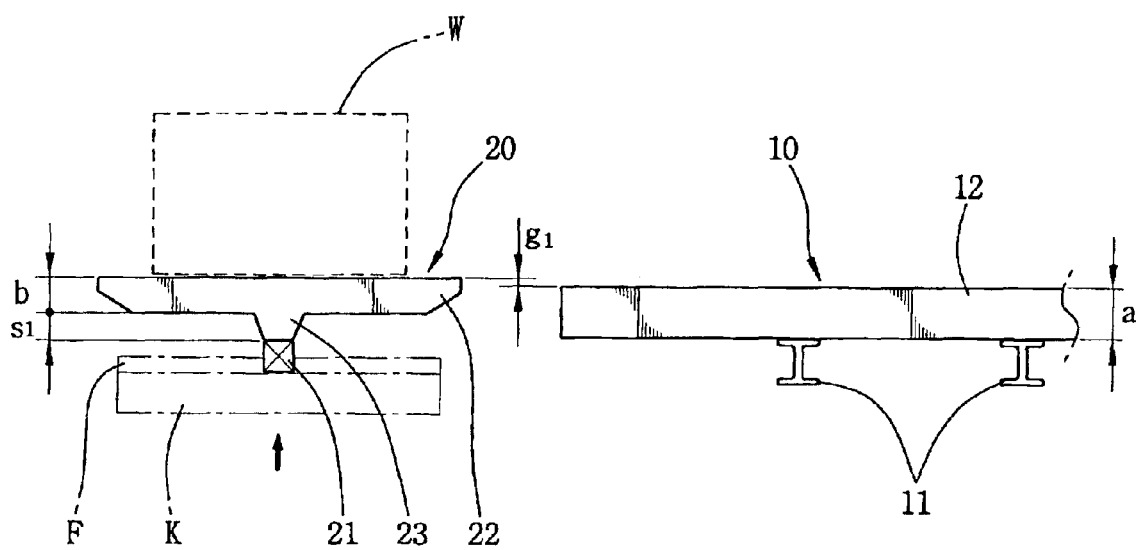
FIGS. 7A, 7B, 7C and 7D are front views illustrating sequential operating states associated with the palletless loading structure for the storage system.

As shown in FIG. 7A, the transporting fork 20 loaded with goods W out of the outside is moved upward to a target empty storage fork 10 of a rack R through the elevation space by the stacker crane C. At this time, the transporting fork 20 is stopped at a position higher than the upper surfaces of the fork bars 12 of the storage fork 10 by the upper allowance gap "$g_1$". The movement of the transporting fork 20 toward the target storage fork 10 is accomplished under the control of a carriage K of the stacker crane C with a plurality of sensors (not shown).

Figure 7B:
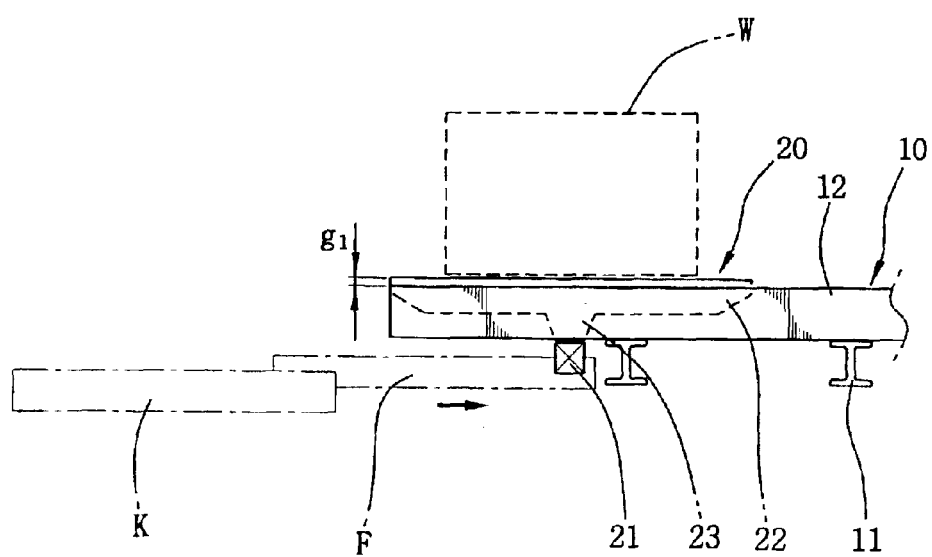

Thereafter, as shown in FIG. 7B, the transporting fork 20 laterally approaches the storage fork 10 by the operation of the laterally movable attachment fork F mounted on the carriage K. The lateral movement of the transporting fork 20 forces the transporting fork bars 22 to be alternately positioned between the storage fork bars 12. At this time, the support beam 21 of the transporting fork 20 is entered into the storage fork 10 to be close to the support beam 11 without any interference with the storage fork bar 12, since the transporting fork 20 is provided with the lower projecting tap 23 having the predetermined height "$s_1$".

That is, since the transporting fork bar 22 has the height "$s_1$" higher than the sum of the upper and lower operational allowance gaps "$g_1$" and "$g_2$", that is, $s_1 > g_1 + g_2$, the support beam 21 does not interfere with the storage fork bar 12, even if the transporting fork 20 horizontally approaches the storage fork 10 with the upper surface of the transporting fork bars 22 being raised up to a level higher than the upper surfaces of the storage fork bars 12 by the upper allowance gap "$g_1$".

Each center of the support beam 11 is positioned as its width far away from the center of each storage space in an approaching direction of the transporting fork 20. It allows the transporting fork bars 22 to be completely entered into the storage fork bars 12 in a horizontal direction. The goods W loaded on the transporting fork 20 are thus positioned above the storage fork 10.

Figure 7C:
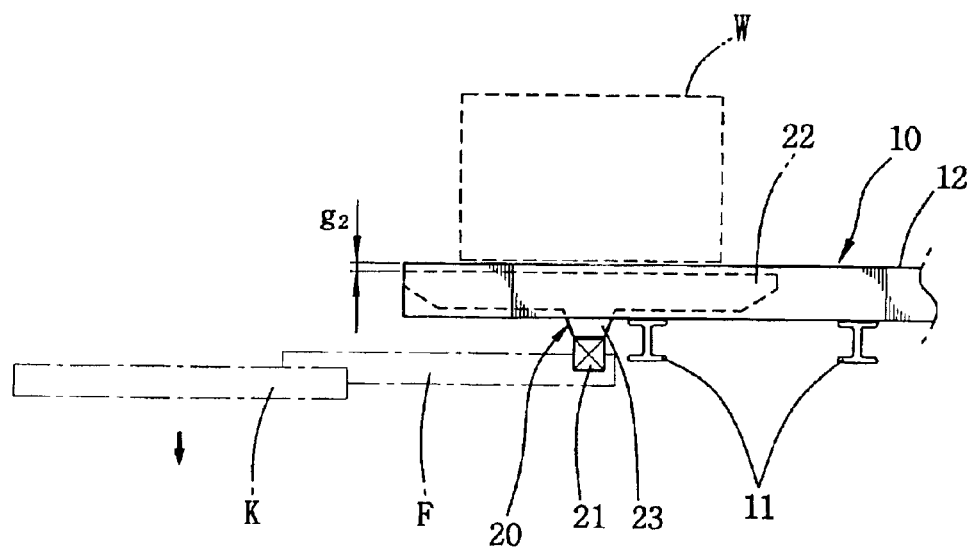

As shown in FIG. 7C, Thereafter, the carriage K of the stacker crane C is moved downward by a height equal to the sum of the upper and lower operational allowances "$g_1$" and "$g_2$" The upper surfaces of the transporting fork bars 22 are thus positioned at a level lower than the upper surfaces of the storage fork bars 12 by the lower allowance "$g_2$", so that the goods W are loaded from the transporting fork bars 22 onto the storage fork bars 12.

Figure 7D:
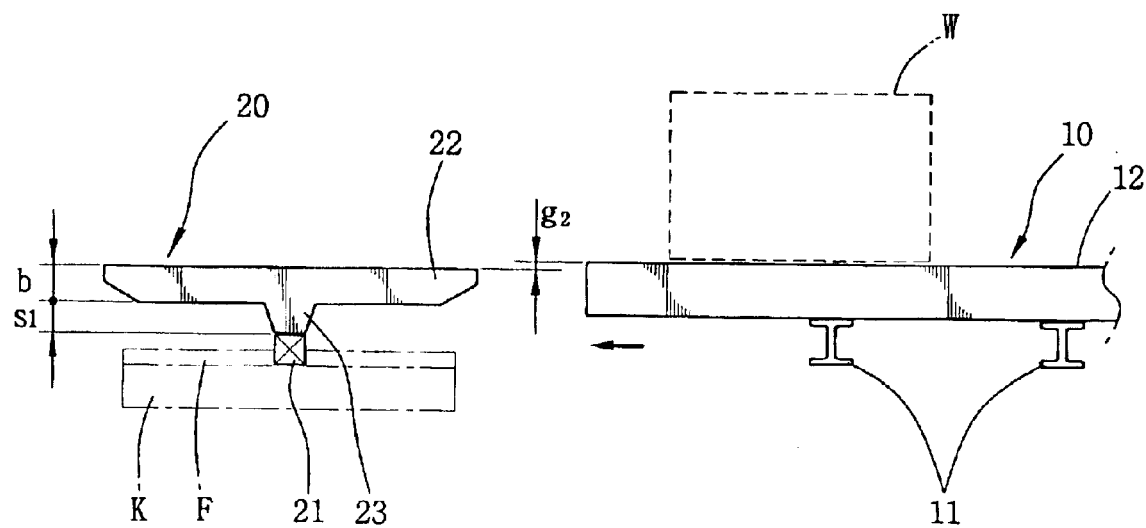
Figure 8:
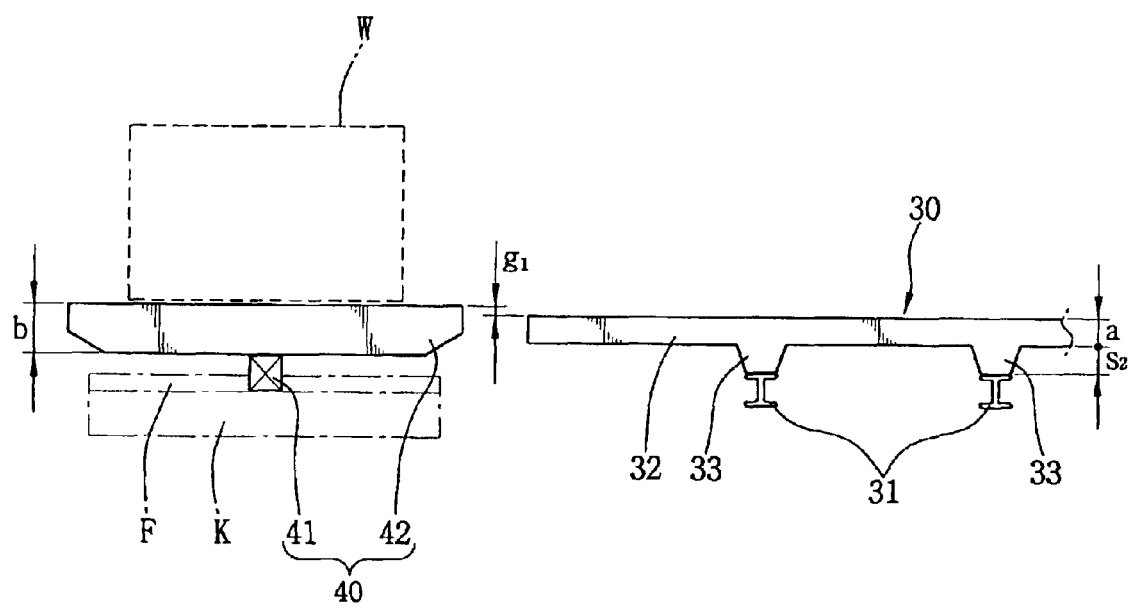
FIG. 8 is a front view illustrating a palletless loading structure for a storage system according to a second embodiment of the present invention.

After loading the goods W onto the storage fork bars 12 as described above, the fork F of the stacker crane C is returned to its original position in the elevation space, so that the transporting fork 20 withdraws from the storage fork 10 to accomplish a loading operation for storing the goods W on the storage fork 10, as shown in FIG. 7d.

During an unloading operation for taking goods W out of a storage fork 10, the transporting fork 20 is moved relative to the storage fork 10 in the reverse order.

As described above, the palletless loading structure for the storage system enables the transporting fork 20 to laterally approach or withdraw from the storage fork 10 at a position almost similar to that of the storage fork 10 and to be lifted and dropped with respect to the storage fork bars 11 by the sum of minimum upper and lower operational allowance gaps "$g_1$" and "$g_2$" which are determined to allow goods W to avoid any interference between the storage for bar 12 and the transporting fork bar 22 or goods W during the lateral movement of the transporting fork 20 relative to the storage fork 10, thus smoothly loading goods W onto or unloading them from the storage fork 10. The palletless loading structure thus has a simple configuration and minimizes a time required to load goods onto or unload them from the storage fork 10.

FIGS. 8 and 9A to 9D show a palletless loading structure for a storage system according to a second embodiment of the present invention.

According to the second embodiment, the palletless loading structure is constructed contrary to those of a transporting fork bar of a transporting fork and a storage fork bar of a storage fork according to the primary embodiment. That is, a height "a" of a storage fork bar 32 is set to be less than a height "b" of a transporting fork bar 42 by at least operational allowance gap "$g_1$" or "$g_2$". In addition, a lower projecting tap 33 having a predetermined height "$s_2$" is projected from the lower surface of each storage fork bar 32, the lower surface of which is mounted to a support beam 31.

The height "$s_2$" of the lower projecting tap is determined to be larger than a sum of the upper and lower operational allowance gaps "$g_1$" and "$g_2$" which permits the transporting fork 40 to smoothly load goods W onto or unload them from the storage fork 30, that is, $s_2 > g_1 + g_2$.

Figure 9A:
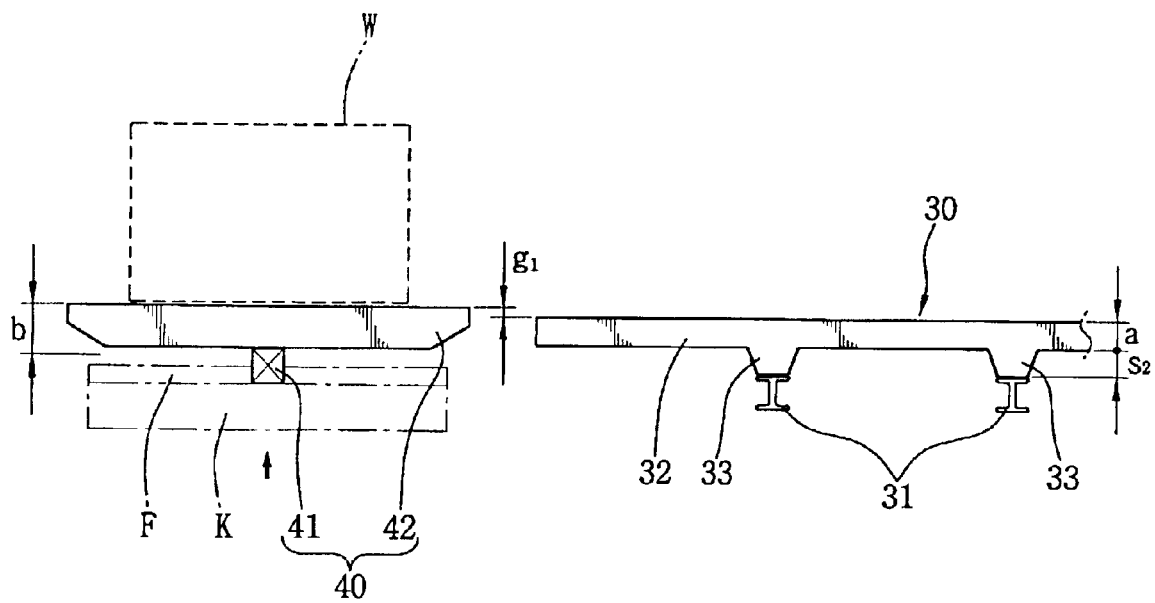
FIGS. 9A, 9B, 9C and 9D are front views illustrating sequential operating states associated with the palletless loading structure for the storage system according to the second embodiment of the invention.
Figure 9B:
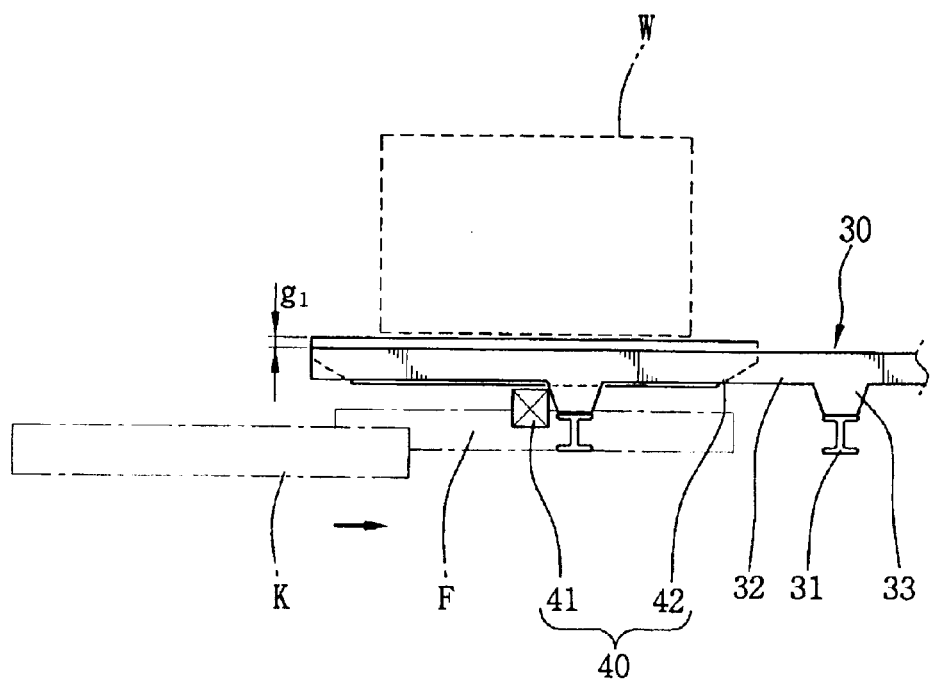

Therefore, even if the transporting fork 40 loaded with goods W horizontally approaches the storage fork 30 at a level higher than the upper surfaces of the storage fork bar 32 by the upper allowance gap "$g_1$" as shown in FIG. 9A, the transporting fork bars 42 are smoothly entered into spaces between the storage fork bars 32 to be closely adjacent the support 31 without any interference as shown in FIG. 9B.

Figure 9C:
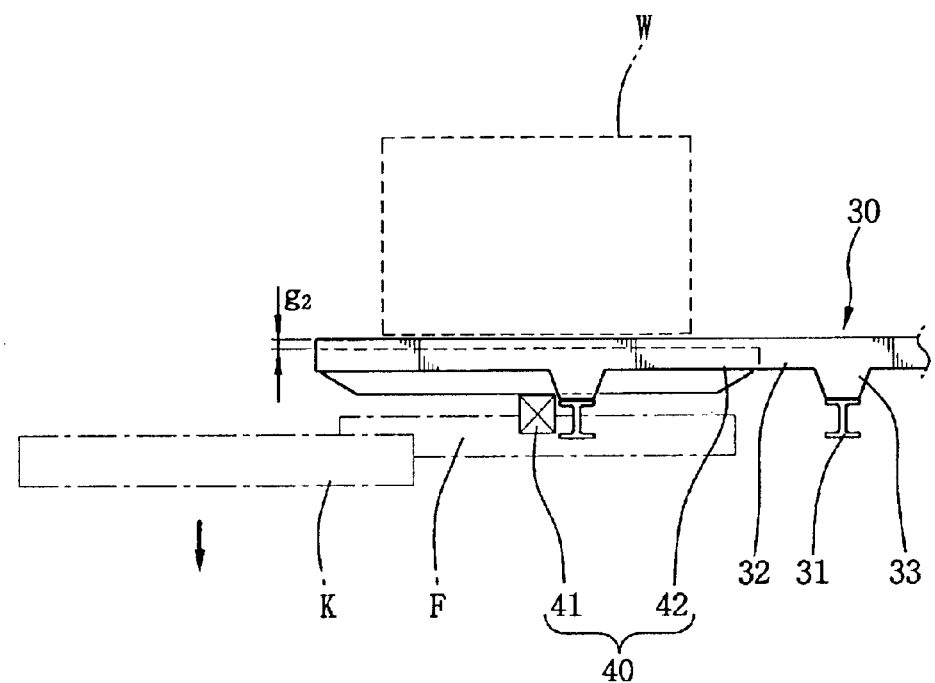

Thereafter, as shown in FIG. 9C, the transporting fork 40 is moved downward to position the upper surface of the transporting fork bar 42 at a level lower than the upper surfaces of the storage fork bars 32 by the lower allowance gap "$g_2$". Regardless of the downward movement of the transporting fork 40, the transporting fork bars 42 do not interfere with the support beam 31, because the height "$s_2$" of the lower projecting tap 33 of each storage fork bar 32 is larger than the sum of the upper and lower operational allowance gaps "$g_1$" and "$g_2$", that is, $s_2 > g_1 + g_2$. Therefore, goods W are loaded from the transporting fork bars 42 onto the storage fork bars 32.

Figure 9D:
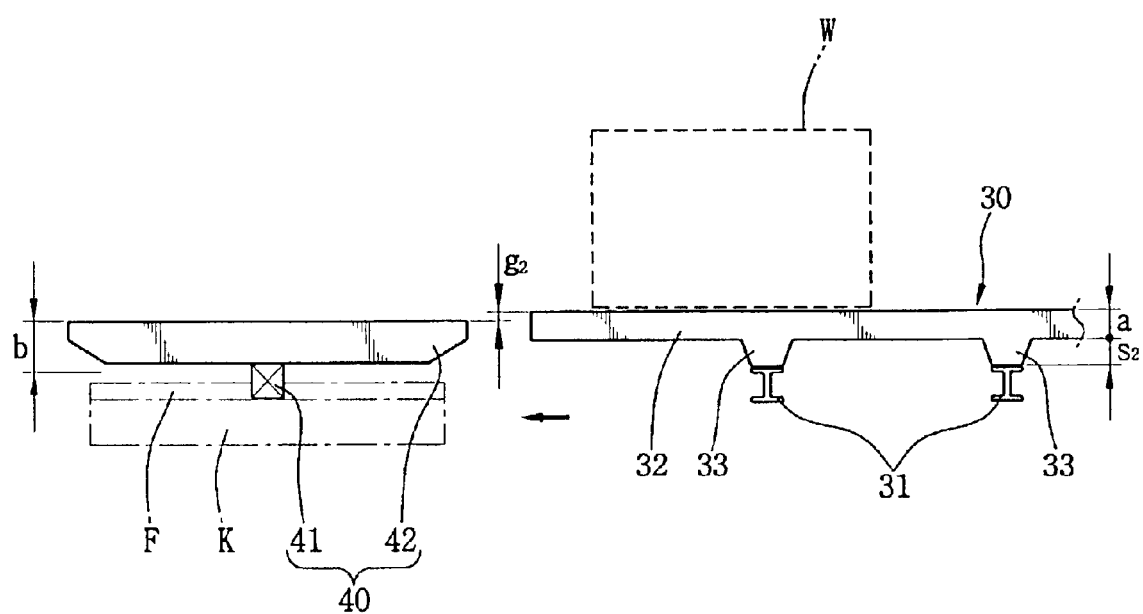
Figure 10:
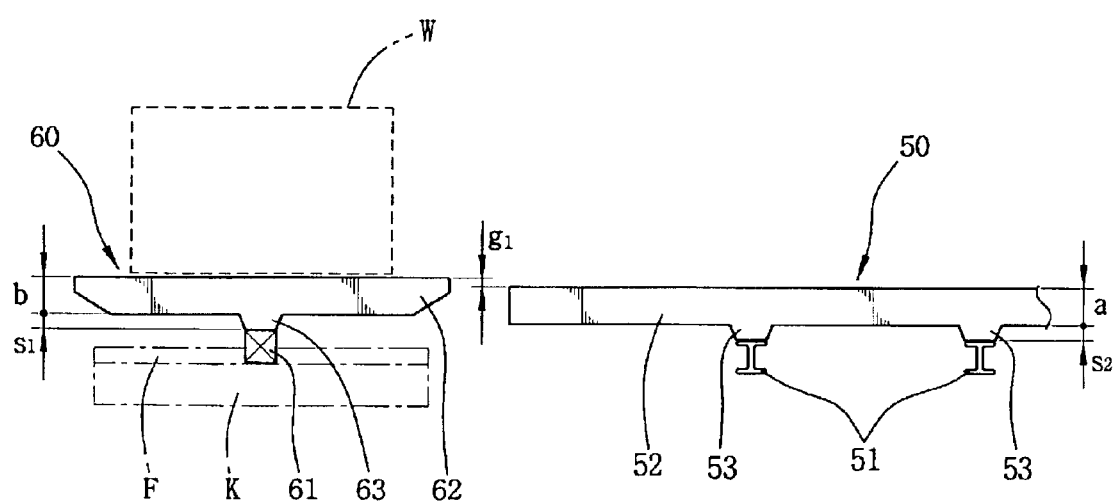
FIG. 10 is a front view illustrating a palletless loading structure for a storage systems according to a third embodiment of the present invention.
Figure 11A:
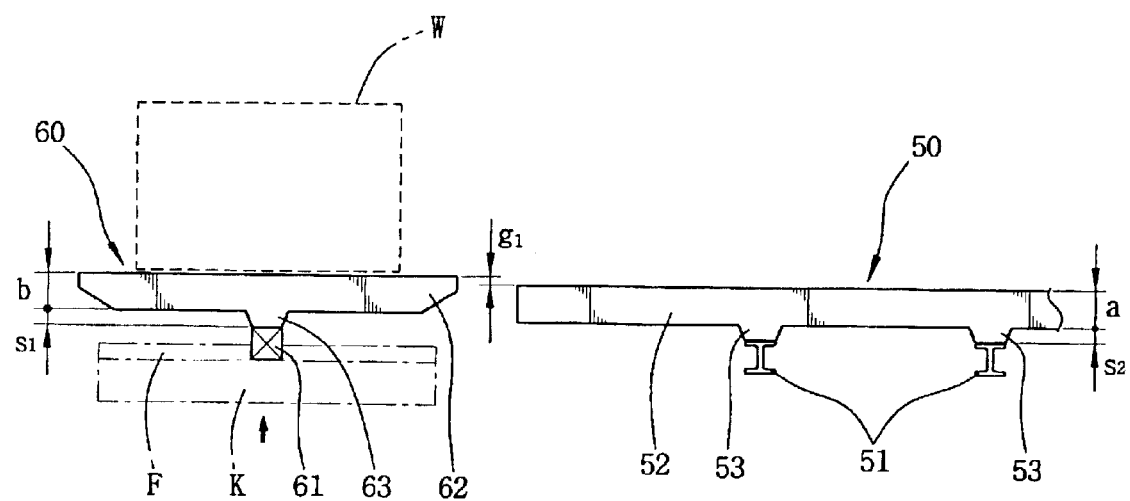
FIGS. 11A, 11B, 11C and 11D are front views illustrating sequential operating states of the palletless loading structure for the storage system according to the third embodiment of the present invention.
Figure 11B:
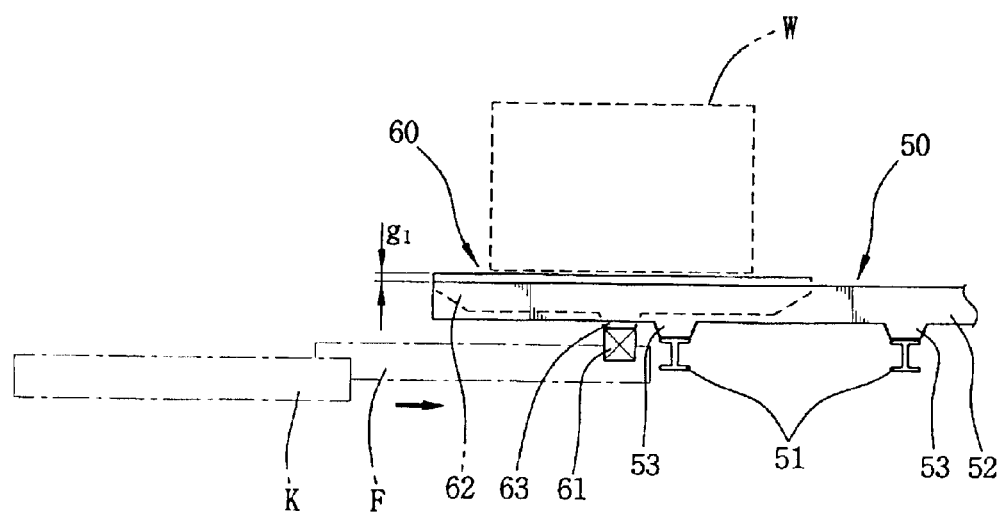
Figure 11C:
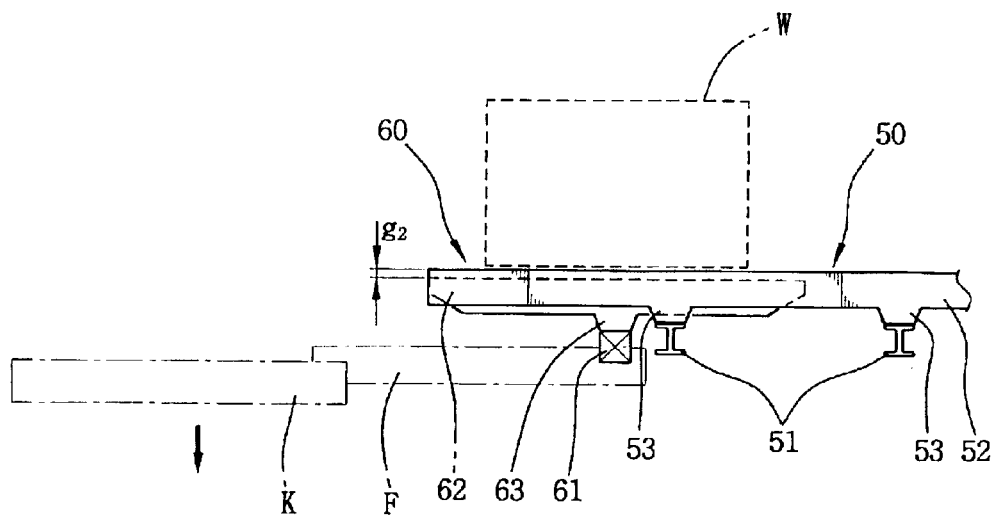
Figure 11D:
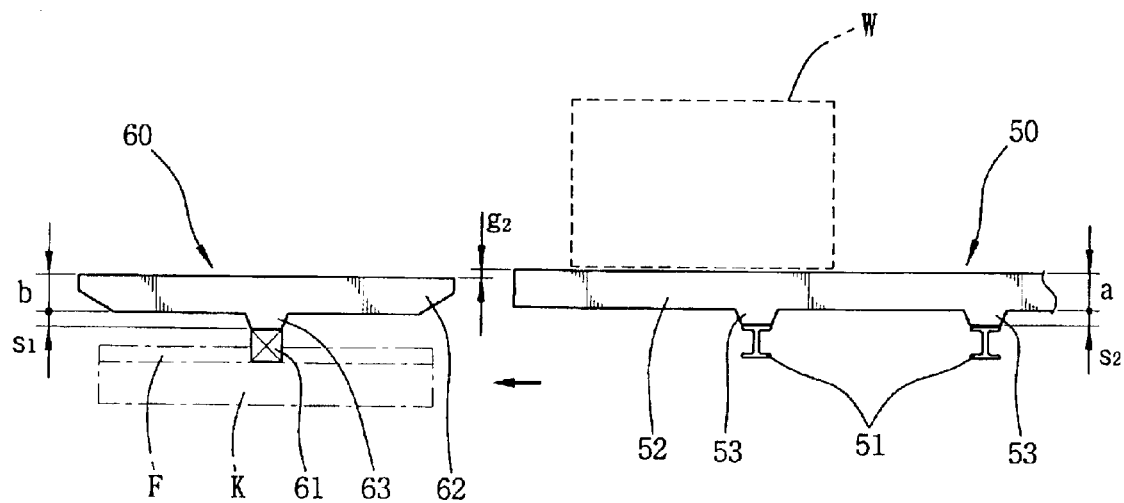

As shown in FIG. 9D, after loading the goods W onto the storage fork bar 32, the transporting fork 40 withdraws from the storage fork 30 to be returned to its original position. At this time, the transporting fork 40 avoids any interference with goods W or the support beam 31 of the storage fork 30 due to the height "$s_2$" of the lower projecting taps 33 of the storage fork 30.

FIGS. 10 and 11A to 11D show a palletless loading structure for a storage system according to a third embodiment of the present invention.

The palletless loading structure for the storage system is constructed according to a combination of the principles of the two embodiments. That is, a height "a" of a storage fork bar 52 of each storage fork 50 and a height "b" of a transporting fork bar 62 of a transporting fork 60 are set to be equal to each other, and lower projecting taps 53 and 63 having predetermined heights "$s_1$" and "$s_2$" are respectively provided on the lower surfaces of each of storage fork bars 53 and the transporting fork bars 62. The storage fork bars 52 of each storage fork 50 are mounted to a support beam 51 at the lower surfaces of the lower projecting taps 53, and the transporting fork bars 62 are mounted to a support beam 61 at the lower surfaces of the lower projecting taps 63.

The heights "$s_1$" and "$s_2$" of two types of lower projecting taps 63 and 53 are respectively determined to be larger than the upper and lower operational allowance gaps "$g_1$" and "$g_2$". It permits the transporting fork 60 to smoothly load goods W onto or unload them from the storage fork 50, that is, $s_1 > g_1$, $s_2 > s_2$. In addition, the heights "a" and "b" of the storage and transporting fork bars 52 and 62 are respectively determined to be equal to the smaller heights of corresponding fork bars in the primary and second embodiments.

The operation of the palletless loading structure according to the third embodiment is similar to that described in the primary and second embodiments except for the following differences. That is, as shown in FIGS. 11A to 11D, when the transporting fork 60 horizontally approaches a storage fork 50, any interference between the transporting fork 60 and the storage fork 50 is avoided due to the lower projecting tap 63 of the transporting fork bar 62. In addition, when the transporting fork 60 is moved downward or upward to load goods W onto or unload them from the storage fork 50 and withdraws from the storage fork 50 after loading or unloading the goods W, any interference between the transporting fork 60 and the storage fork 50 is avoided due to the lower projecting tap 53 of the storage fork bar 52.

According to the third embodiment, it is possible to reduce the heights "a" and "b" of the storage and transporting fork bar 52 and 62 and the heights "$s_1$" and "$s_2$" of the lower projecting taps 63 and 53, in comparison with the primary and second embodiments. The palletless loading structure can reduce a time in taking goods W into or taking them out of the storage fork 50 as well as a space of the storage system.

As described above, the present invention is to provide a palletless loading structure for a storage system which enables a transporting fork to be moved upward or downward in a vertical direction within a predetermined minimum range while the transporting fork bars of a transporting fork are alternatively superposed between the storage fork bars of a storage fork after the transporting fork completely approaches the storage fork in a horizontal direction, thereby loading goods onto or unloading them from the storage fork. In other words, the vertical minimum range for permitting the transporting fork to be moved relative to the storage fork is determined to avoid any interference between goods and the transporting fork or the storage fork, when the transporting fork laterally approaches or withdraws from the storage fork while loading goods onto or unloading them from the storage fork. It is possible to quickly and safely load goods onto or unload them from a storage system.

Also, the present invention doesn't need additional pallets because a transporting fork itself directly takes goods into or takes goods out of a storage fork.

Also, the present invention comprises storages fork bars of a storage fork mounted on the upper surface of a support beam in parallel to each another and lengthwise to the support beam, thereby enabling various sizes of goods to be loaded thereon within the limitation of a storage space of racks.

Therefore, the present invention has superior advantages in the quickness and accuracy of the delivery and shipment of goods, the enhancement of the storage efficiency, the effective management structural stability and the reliability in a storage system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A palletless loading structure for storage systems including edge racks $R_1$ and intermediate racks $R_2$ provided with a plurality of storage spaces and a transporting unit so that fork bars of a transporting fork are entered into, lifted above for unloading, dropped below for loading and withdrawn from a storage fork with the fork bars of the transporting fork being alternatively superposed between fork bars of the storage fork to force firm goods having a nearly flat bottom side to be taken into or taken out of the storage spaces comprising:

a storage fork including a first support beam horizontally mounted near the middle of the storage space in the edge racks $R_1$, a second support beam horizontally mounted near the middle of the storage space, the first and second support beams being spaced in a regular interval from each other to make the storage space be right and left symmetric in the intermediate racks $R_2$ mounted between the edge racks $R_1$ and a plurality of storage fork bars mounted in a regular interval on an upper portion of the first support beam while crossing the first support beam at a right angle; and a stacker crane operable in multi-axial directions, as the transporting mechanism and including a plurality of transporting fork bars horizontally arranged in a regular interval to be alternatively positioned between the storage fork bars and a third support beam supporting the lower middle surface of the transporting fork bars, wherein any one height of the storage fork bar and the transporting fork bars is set to be relatively higher than the other one, and the fork bars having a relatively lower height include a projecting tap mounted on the lower portion thereof, the projecting tap mounted on the support beam, in which the transporting fork bars approach laterally from one side of the storage space in the edge racks $R_1$ and from both right side and left side of the storage space in the intermediate racks $R_2$ mounted between the edge racks $R_1$, and are lifted above for unloading, dropped below for loading and withdrawn from the storage fork with the fork bars of the transporting fork being alternatively superposed between fork bars of the storage fork.

2. The palletless loading structure for the storage system according to claim 1, wherein the stacker crane is entered into and withdrawn from the storage fork so that the upper end of one fork bar is positioned over and/or below the upper end of the other fork bar by a predetermined gap.

3. The palletless loading structure for the storage system according to claim 2, wherein a height difference between the fork bars is determined to be larger than a level difference between the upper ends of the fork bars to be required at the time that the stacker crane laterally approaches or withdraws from the storage fork.

4. The palletless loading structure for the storage system according to claim 2, wherein the height of the lower projecting tap is determined to be larger than a sum of gaps between the upper surfaces of the fork bars to be formed at the time that the stacker crane laterally withdraws from the storage fork.

5. The palletless loading structure for the storage system according to claim 1, wherein each center of the first support beam and the second support beam are positioned as the width of each support beam far away from the center of each storage space in an approaching direction of the transporting fork to each support beam.

6. A palletless loading structure for storage systems including edge racks $R_1$ and intermediate racks $R_2$ provided with a plurality of storage spaces and a transporting unit so that fork bars of a transporting fork are entered into, lifted above for unloading, dropped below for loading and withdrawn from a storage fork with the fork bars of the transporting fork being alternatively superposed between fork bars of the storage fork to force firm goods having a nearly flat bottom side to be taken into or taken out of the storage spaces comprising:

a storage fork including a first support beam horizontally mounted near the middle of storage space in the edge racks $R_1$, a second support beam horizontally mounted near the middle of the storage space, the first and second support beams are spaced in a regular interval from each other to make the storage space be right and left symmetric in the intermediate racks $R_2$ mounted between the edge racks $R_1$ and a plurality of storage fork bars each having a first lower projecting tap with a predetermined height being extended downward from a lower portion thereof, which is horizontally mounted in a regular interval on an upper portion of the first and second support beams while crossing the first support beam at a right angle; and a stacker crane operable in multi-axial directions, as the transporting means, and including a plurality of transporting fork bars horizontally arranged in a regular interval to be alternatively positioned between the storage fork bars and a third support beam supporting the lower middle portion of the transporting fork bars, wherein the transporting fork bars include a second lower projecting tap having a predetermined height extended downward from the center portion thereof, in which the transporting fork bars approach laterally from one side of the storage space in the edge racks $R_1$ and from both right side and left side of the storage space in the intermediate racks $R_2$ mounted between the edge racks $R_1$ and are lifted above for unloading, dropped below for loading and withdrawn from the storage fork with the fork bars of the transporting fork being alternatively superposed between fork bars of the storage fork.

7. The palletless loading structure for the storage system according to claim 6, wherein the upper surface of the transporting fork bar is positioned at a level higher and/or lower than the upper surface of the storage fork bar by a predetermined gap at the time that the stacker crane laterally approaches and/or withdraws from the storage fork.

8. The palletless loading structure for the storage system according to claim 7, wherein the heights of the first and second lower projecting taps are determined to be larger than a first gap between the upper surfaces of the storage fork bar and the transporting fork bar at the time that the transporting fork loaded with goods laterally approaches the storage fork and a second gap between the upper surfaces of the storage fork bar and the transporting fork bar at the time that the stacker crane laterally withdraws from the storage fork.

9. The palletless loading structure for the storage system according to claim 6, wherein each center of the first support beam and the second support beam are positioned as the width of each support beam far away from the center of each storage space in an approaching direction of the transporting fork to each support beam.

* * * * *